United States Patent [19]

Stella et al.

[11] Patent Number: 5,095,595
[45] Date of Patent: Mar. 17, 1992

[54] ACTUATOR FOR RESTRAINT/RELEASE (R/R) DEVICES, PARTICULARLY FOR SPACE APPLICATIONS

[75] Inventors: Domenico Stella; Giovanni Secci, both of Roma, Italy

[73] Assignee: Contraves Italiana, Rome, Italy

[21] Appl. No.: 596,258

[22] Filed: Oct. 12, 1990

[30] Foreign Application Priority Data

May 16, 1990 [EP] European Pat. Off. ......... 90830214.4

[51] Int. Cl.⁵ .............................................. A44B 21/00
[52] U.S. Cl. .......................................... 24/603; 292/201; 403/32; 403/404
[58] Field of Search ............... 24/602, 603; 403/32, 403/404; 292/201, 144, DIG. 69

[56] References Cited

U.S. PATENT DOCUMENTS

| | | | |
|---|---|---|---|
| 1,940,027 | 12/1933 | Smith | 292/201 |
| 2,034,971 | 3/1936 | Brockway | 292/201 X |
| 3,608,848 | 9/1971 | Cantor et al. | |
| 4,030,322 | 6/1977 | Pettit | 292/201 X |
| 4,074,545 | 2/1978 | Case | 292/DIG. 69 |
| 4,596,483 | 6/1986 | Gabriel | 403/404 X |
| 4,664,429 | 5/1987 | Notaro et al. | 292/201 |
| 4,682,804 | 7/1987 | Palmer et al. | |
| 4,743,079 | 5/1988 | Bloch | 403/404 X |

FOREIGN PATENT DOCUMENTS 61-22780  1/1986  Japan .
1111414  4/1968  United Kingdom .

Primary Examiner—James R. Brittain
Attorney, Agent, or Firm—R. Neil Sudol; Henry D. Coleman

[57] ABSTRACT

A strip of copper-based shape memory alloy is used as an actuator element in a restraint/release device (R/R) for a deployment mechanism particularly for space applications; the strip heated by a resistance bends and acts on a lever of a latch means to disengage a moving arm of the R/R device.

1 Claim, 1 Drawing Sheet

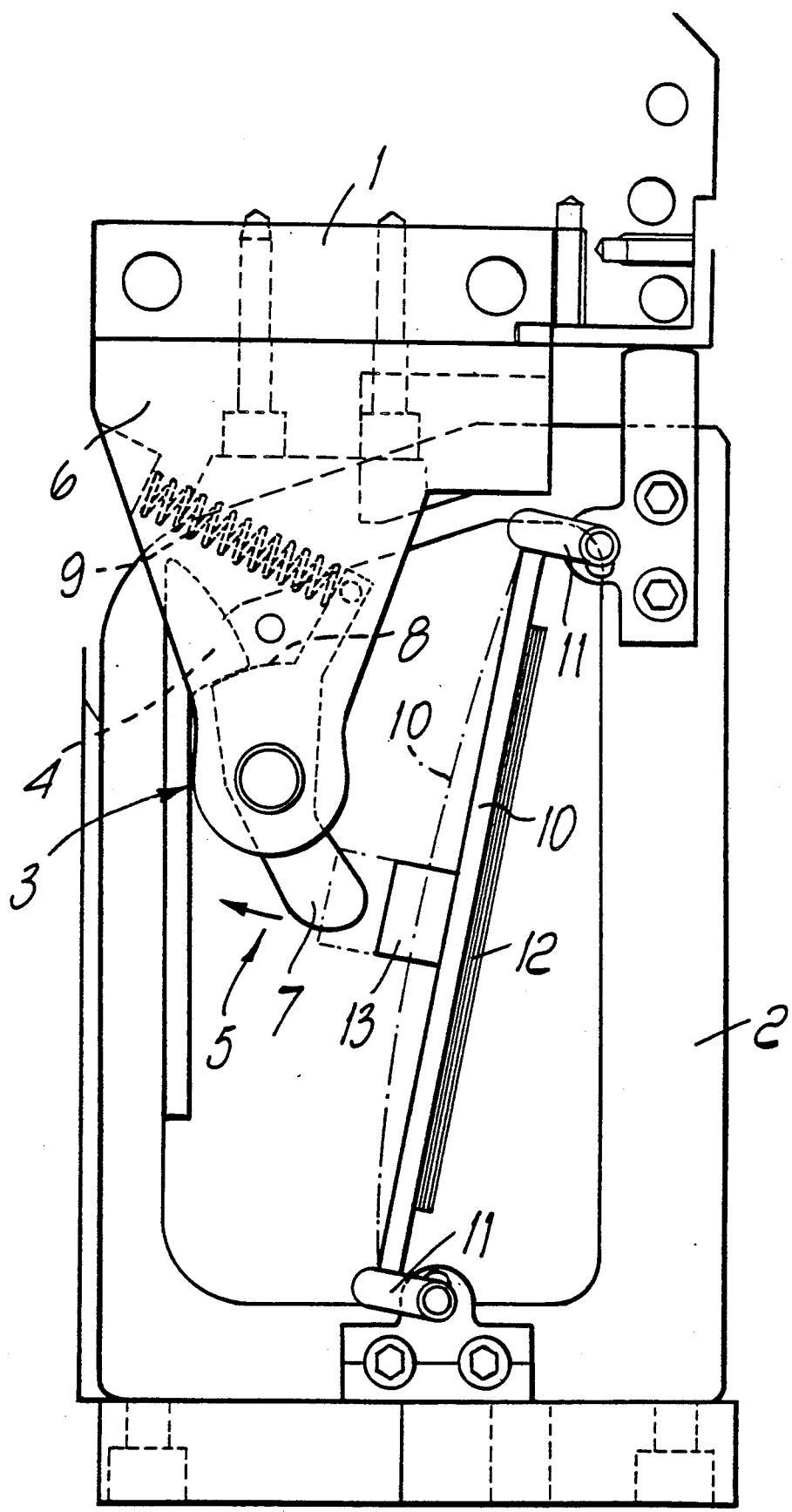

ACTUATOR FOR RESTRAINT/RELEASE (R/R) DEVICES, PARTICULARLY FOR SPACE APPLICATIONS

BACKGROUND OF THE INVENTION

1. Field of the Invention

The present invention relates to an actuator for restraint/release (R/R) devices, particularly for spacecrafts.

2. Description of the Prior Art

The R/R devices are used in space applications to deploy large structures such as antenna reflectors, solar arrays, etc.; several kinds of actuators for these devices are known in the art and most of them are based on electric motors or magnetic devices.

These known actuators have several drawbacks especially related to their excessive mass and size which are very important parameters in space applications.

The known actuators have also shown poor performances when a relatively high force is required to actuate the R/R device.

The aim of the present invention is to provide a light weight and small actuator for R/R devices, particularly for space applications such as deployment mechanisms for antennas or other large structures.

Within this aim, an object of the invention is to provide a reliable actuator having a good performance over repeated operations.

SUMMARY OF THE INVENTION

The above aim, as well as this and other objects that will be more apparent later, are achieved by an actuator for a restraint/release device, particularly for the deployment of structures in spacecrafts and comprising a moving arm articulated to a frame, said restraint/release device further having a latch means defining a restraint position and a release position, said latch means having a cam member, characterized in that said actuator comprises a shape memory alloy copper based strip and an electrical resistance member, said resistance member being coupled to said strip, said strip being associated with said frame of said restraint/release device and having a pusher member adapted to engaged said cam member of said latch to release said latch, said resistance member being connected to a power source and being adapted to heat said strip in such a way that when said power source powers said resistance member said strip is heated and bends, said pusher member thus engaging said cam member to disengage said latch means.

BRIEF DESCRIPTION OF THE DRAWINGS

Further characteristics and advantages of the invention will be more apparent by the following description of an embodiment of the invention, illustrated, by way of example, in the enclosed drawing that illustrates a side sectioned view of an actuator schematically shown as applied to a restraint/release device.

DESCRIPTION OF THE PREFERRED EMBODIMENTS OF THE INVENTION

With reference to the drawing, a restraint/release device is partially and schematically shown comprising a moving arm 1 articulated to a frame 2 in a per se known manner not illustrated in the drawing.

A latch means 3 comprises a hook element 4 associated with the frame 2 and a lever 5 pivoted to a tab 6 of the moving arm 1.

The lever 5 comprises a first end having a cam member 7, and a second end having a ledge member 8 adapted to engage the hook element 4.

The latch means defines a restraint position in which the hook element 4 engages the ledge member 8, and a release position in which the ledge 8 is disengaged by the hook 4 and the moving arm 1 can rotate for the deployment of the structure (not illustrated).

A resilient member, such as a spring 9, is associated with the second end of the lever 5 and with the moving arm 1 and is adapted to bias the latch means in the restraint position.

The actuator further comprises an electrical resistance member 12 coupled to a strip 10, associated with the frame 2 preferably by means of hinges 11.

The strip is made of copper-based shape memory alloy and comprises a pusher member 13 adapted to engage the cam member 7 of the lever 5.

The electrical resistance 12 is connected to a power source (not illustrated in the drawing) and is adapted to heat the metal strip 10 when powered by the power source.

The operation of the actuator is the following.

When desired, the power source powers the resistance member 12 which heats the metal strip 10. When the metal strip reaches a selected temperature, it bends, as schematically shown by dashed lines in the drawing, and the pusher member 13 pushes the cam member 7 rotating the lever 5. The ledge 8 is thus disengaged from the hook 4 and the latch moves to the release position allowing the moving arm to rotate to deploy the structure.

When the metal strip 10 cools off, the electrical resistance not being powered anymore, it returns to the normal substantially straight position.

The strip 10 can repeat this operation for several times without any degradation of its physical and geometrical characteristics.

It has been seen in practice how the invention achieves the intended aim by providing a light weight and small size actuator for deployment mechanisms particularly adapted for space applications.

An important advantage of the actuator, according to the invention, being that of its reliability for a large number of operation cycles.

The actuator according to the invention may have numerous modifications and variations, all within the inventive concept; furthermore, all the details may be substituted with technically equivalent elements.

The materials employed, as well as the dimensions, may be any according to the specific needs and the state of the art.

Where technical features mentioned in any claim are followed by reference signs, those reference signs have been included for the sole purpose of increasing the intelligibility of the claims and accordingly, such reference signs do not have any limiting effect on the scope of each element identified by way of example by such reference signs.

We claim:

1. Actuator for a restraint/release device, particularly for the deployment of structures in spacecrafts and comprising a moving arm articulated to a frame, said restraint/release device further having a latch means defining a restraint position and a release position, said latch means having a cam member, said actuator comprising a shape memory alloy copper based strip and an electrical resistance member, said electrical resistance member being coupled to said strip, said strip being associated with said frame of said rstraint/release device and having a pusher member adapted to engage said cam member of said latch means to release said latch means, said resistance member being connected to a power source and being adapted to heat said strip in such a way that when said power source powers said resistance member said strip is heated and bends said pusher member, thus engaging said cam member to disengage said latch means, said latch means comprising a hook element associated with said frame of said restraint/release device and a lever element pivoted to said moving arm, said lever element comprising a first end and a second end, said first end having said cam member, said second end having a ledge member adapted to be engaged by said hook element in said restraint position, a resilient member being connected to said lever element and to said moving arm to bias said lever element in said rstraint position.

* * * * *